United States Patent [19]
Kaminski

[11] 3,991,357
[45] Nov. 9, 1976

[54] STORAGE BATTERY MONITORING AND RECHARGING CONTROL SYSTEM WITH AUTOMATIC CONTROL OF PRIME MOVER DRIVING CHARGING GENERATOR

[75] Inventor: Donald F. Kaminski, Sidney, Ohio

[73] Assignee: The Stolle Corporation, Sidney, Ohio

[22] Filed: May 1, 1975

[21] Appl. No.: 573,451

Related U.S. Application Data
[63] Continuation-in-part of Ser. No. 465,541, April 30, 1974, abandoned.

[52] U.S. Cl. ............................... 320/32; 290/37 R; 322/10; 320/62; 290/50
[51] Int. Cl.² ....................... H02J 7/00; H02P 9/04; B60L 11/12
[58] Field of Search .............................. 322/10–13; 320/62, 31, 32, 39, 40; 290/37, 50, 40 R, 40 F, 41

[56] References Cited
UNITED STATES PATENTS

| | | | |
|---|---|---|---|
| 1,507,300 | 9/1924 | Replogle | 322/10 X |
| 1,624,420 | 4/1927 | Menzies | 320/62 X |
| 2,887,588 | 5/1959 | Williams | 290/37 R |

*Primary Examiner*—Robert J. Hickey
*Attorney, Agent, or Firm*—Melville, Strasser, Foster & Hoffman

[57] ABSTRACT

An automatic monitoring and recharging system adapted to continuously monitor the terminal voltage of a D.C. storage battery and, whenever the terminal voltage falls below a first preselected value, to automatically initiate an engine-driven A.C. generator which is utilized to recharge the storage battery. The recharging interval is terminated when the recharging current attains a second preselected value whereupon the system is automatically returned to a voltage monitoring status.

The monitoring and recharging system of the present invention finds particular utility with respect to storage batteries used in association with recreational vehicles.

21 Claims, 3 Drawing Figures

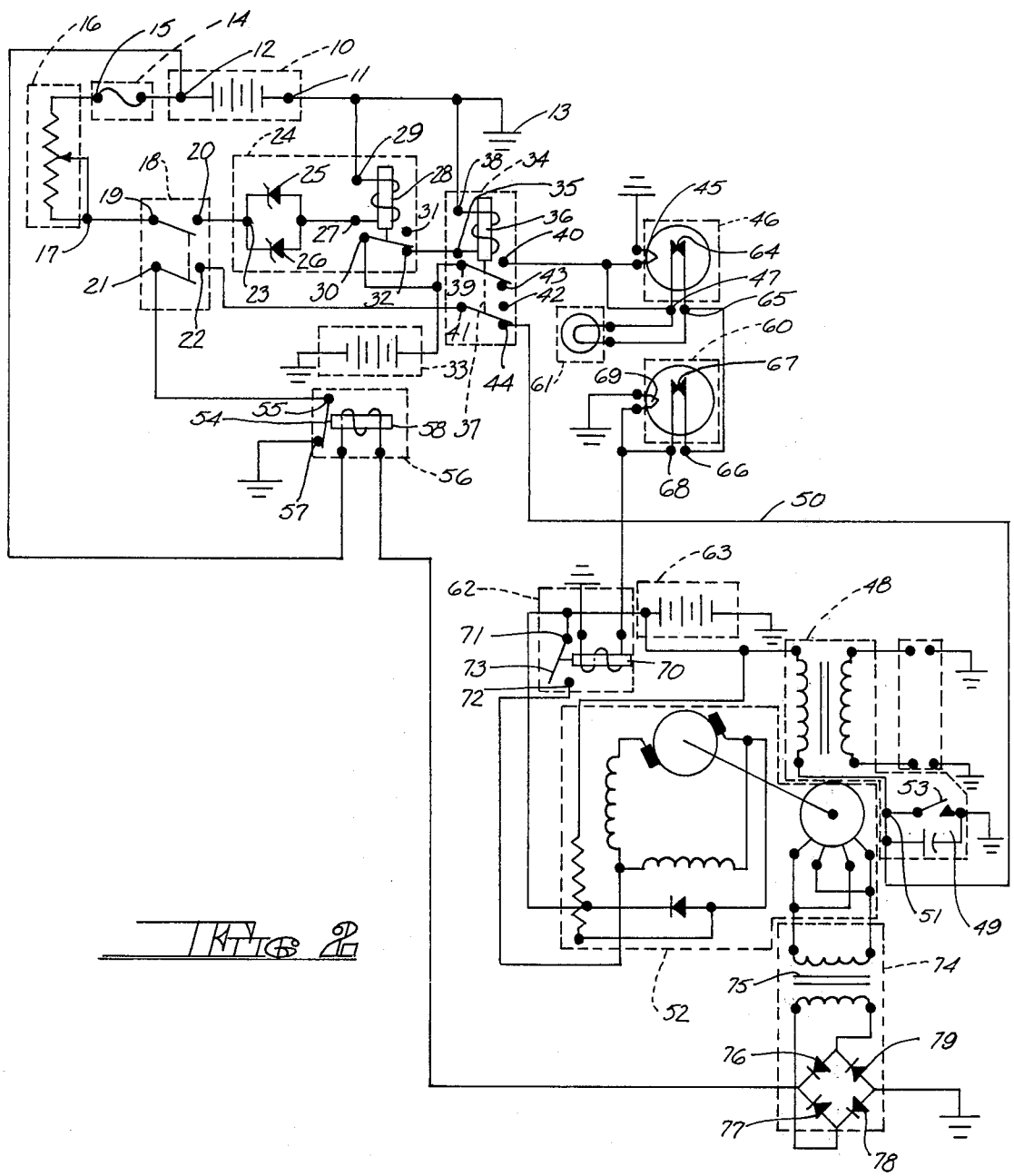

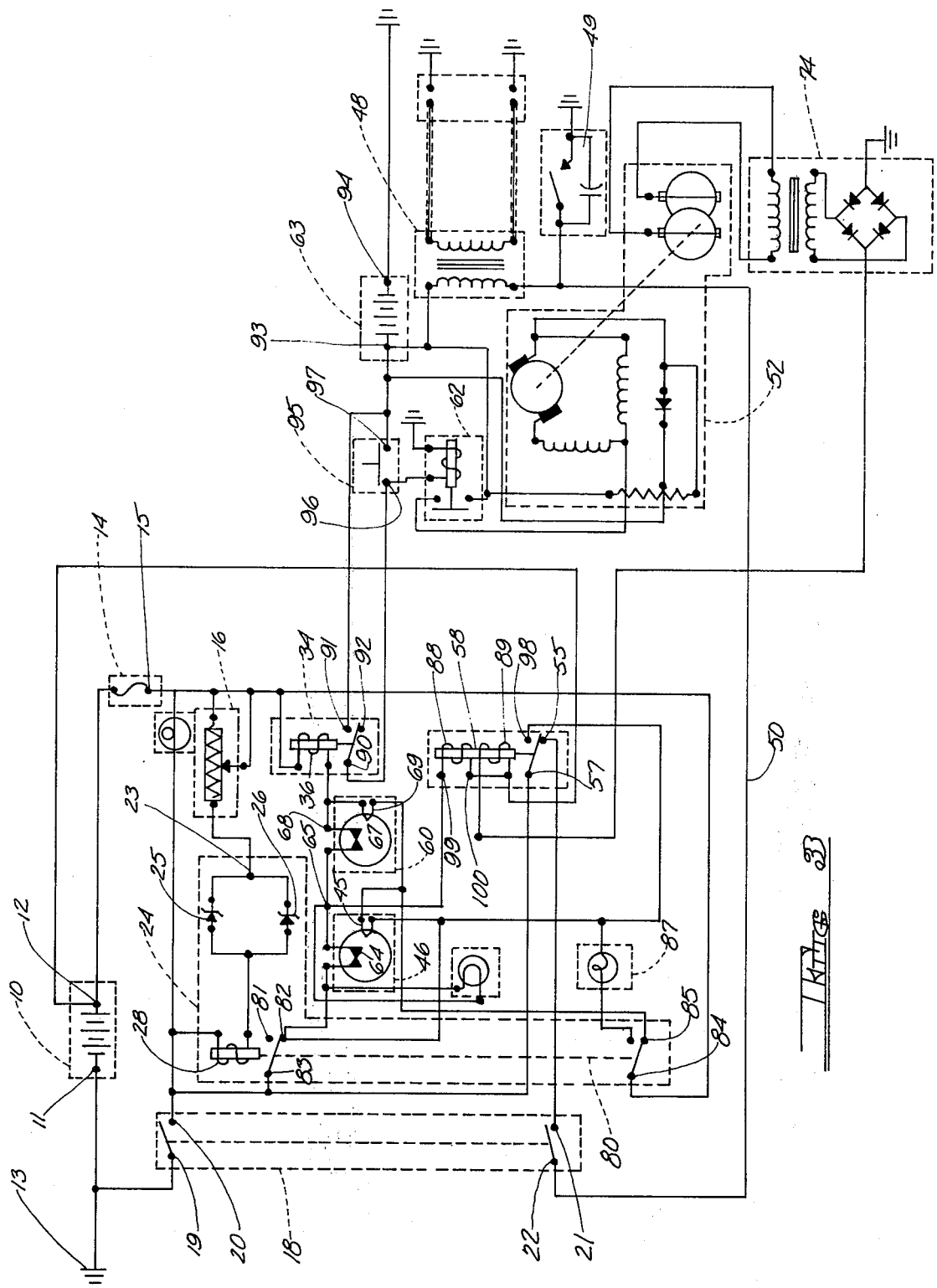

STORAGE BATTERY MONITORING AND RECHARGING CONTROL SYSTEM WITH AUTOMATIC CONTROL OF PRIME MOVER DRIVING CHARGING GENERATOR

CROSS REFERENCE TO RELATED APPLICATION

This is a continuation-in-part of copending application Ser. No. 465,541 filed Apr. 30, 1974, and now abandoned, in the name of Donald F. Kaminski and bearing the same title as the present application.

BACKGROUND OF THE INVENTION

The invention relates to an automatic control system for monitoring and recharging a D.C. storage battery. Although the control system of the present invention is useful in association with any D.C. storage battery whose terminal voltage must be maintained at some preselected level, it finds particular utility with respect to D.C. storage batteries used in association with recreational vehicles.

D.C. storage batteries are commonly used on recreational vehicles to provide a low voltage power source for operating on-board appliances such as lighting, furnaces and water pressure pumps. In order to prevent battery damage, such as warped plates or cell sulphation, resulting from an undercharged battery condition, it is desirable to provide means for assuring that an appropriate battery charge is maintained. This is conveniently accomplished by the control system of the present invention through automatic initiation of an on-board driven A.C. charging generator whenever the charge drops below a preselected level.

The maintenance of an appropriate charge on storage batteries, and particularly storage batteries used in association with recreational vehicles, presents a significant problem to vehicle owners and operators. Although recharging devices, such as A.C. to D.C. converters powered by engine-driven A.C. generators, are standard or optional equipment on the majority of these vehicles, the point of battery recharge initiation is a manual process, left to the discretion of the vehicle owner or operator. In other words, prior art systems for recharging recreational vehicle storage batteries rely on human observation to determine when recharging is necessary and subsequent manual initiation of the recharging process.

Due to the prior art human element, the recharging process is often not initiated until the loss of D.C. power is evident. Manifestations of loss of D.C. power take the form of reduced on-board lighting intensity or improper operation, if not complete failure, of other on-board applicances. By the time such a manifestation has become evident to the vehicle owner or operator, significant battery damage may have already occured.

SUMMARY OF THE INVENTION

It is a general object of the present invention to provide a means whereby damage of D.C. storage batteries, resulting from extended periods of battery undercharge may be alleviated.

More specifically, it is an object of the present invention to provide an automatic monitoring and recharging system adapted to continuously monitor the terminal voltage of a D.C. storage battery and, whenever the terminal voltage drops below a first preselected value, to automatically initiate an engine-driven A.C. generator, the rectified output current of which is utilized to recharge the storage battery. The recharging interval is terminated when the recharging current attains a second preselected value whereupon the system is automatically returned to its voltage monitoring status.

In accordance with the invention, whenever the terminal voltage of the monitored storage battery drops to an adjustable preset level, a voltage sensing circuit, communicating with the storage battery, outputs a low voltage control signal. The voltage sensing circuit output low voltage signal activates an engine control circuit, the latter having a dual function. Upon activation, the engine control circuit simultaneously initiates an engine start control signal for application to the starter solenoid of the engine-generator unit and enables the ignition system thereof by opening a ground path in parallel with its distributor. In an alternate embodiment, this enablement function may be divorced from the engine control circuit.

In connection with its application to the engine-generator unit starter solenoid, the engine start control signal is controlled by two timer means, a primary timer means and a secondary timer means. The primary timer means limits the length of time during which the engine control start signal may be applied to the starter solenoid to a first preselected timing interval while the secondary timer means limits the number of times which the starter solenoid may be activated by the engine start control signal during the first preselected timing interval. Control is accomplished by the secondary timer means through repetitively interrupting, at a preselected rate and for second preselected timing intervals, the engine start control signal.

After the engine-driven A.C. generator has been started by application of the engine control start signal to the starter solenoid, its A.C. output is rectified by a charging means and, thereafter applied through a current sensing circuit to the positive terminal of the D.C. storage battery. The increased voltage at the positive terminal of the D.C. storage battery is immediately sensed by the voltage sensing circuit whereupon the low voltage control signal is terminated thereby deactivating the engine control circuit. Deactivation of the engine control circuit results in termination of the engine start control signal and partial reestablishment of the ground path connected in parallel with the distributor of the engine-generator unit. Only partial reestablishment of the ground path is achieved because the current sensing device controls a switch connected in series with the ground path and, the latter switch opens, breaking the path to ground, whenever the current sensing device is sufficiently energized by the output of the charging means.

Due to the reduced resistance of the undercharged battery at the initiation of the charging process, the charging current through the current sensing circuit will be initially high. The high level of charging current will maintain the current sensing circuit in an energized condition, consequently maintaining the current sensing circuit control switch open providing for continued ignition of the engine-generator unit along with concomitant charging of the storage battery. However, as the charging process continues, the internal resistance of the storage battery will gradually increase thereby proportionately decreasing the current flowing through the current sensing device. When the charging current has decreased to a level sufficient to deenergize the current sensing circuit, the current sensing circuit control switch reestablishes the ground path connected across the engine-generator unit distributor, thereby terminating ignition thereof which, in turn, terminates application of charging current to the storage battery. The storage battery is now fully recharged and the system restored to a voltage monitoring status. Whenever the terminal voltage of the storage battery again drops below the adjustable preset level, a similar automatic recharging process will be initiated.

BRIEF DESCRIPTION OF THE DRAWINGS

FIG. 2 is a detailed circuit schematic of the control system shown in FIG. 1.

FIG. 3 is a detailed circuit schematic of another embodiment of the control system of the present invention.

DESCRIPTION OF THE PREFERRED EMBODIMENTS

Figure 1:
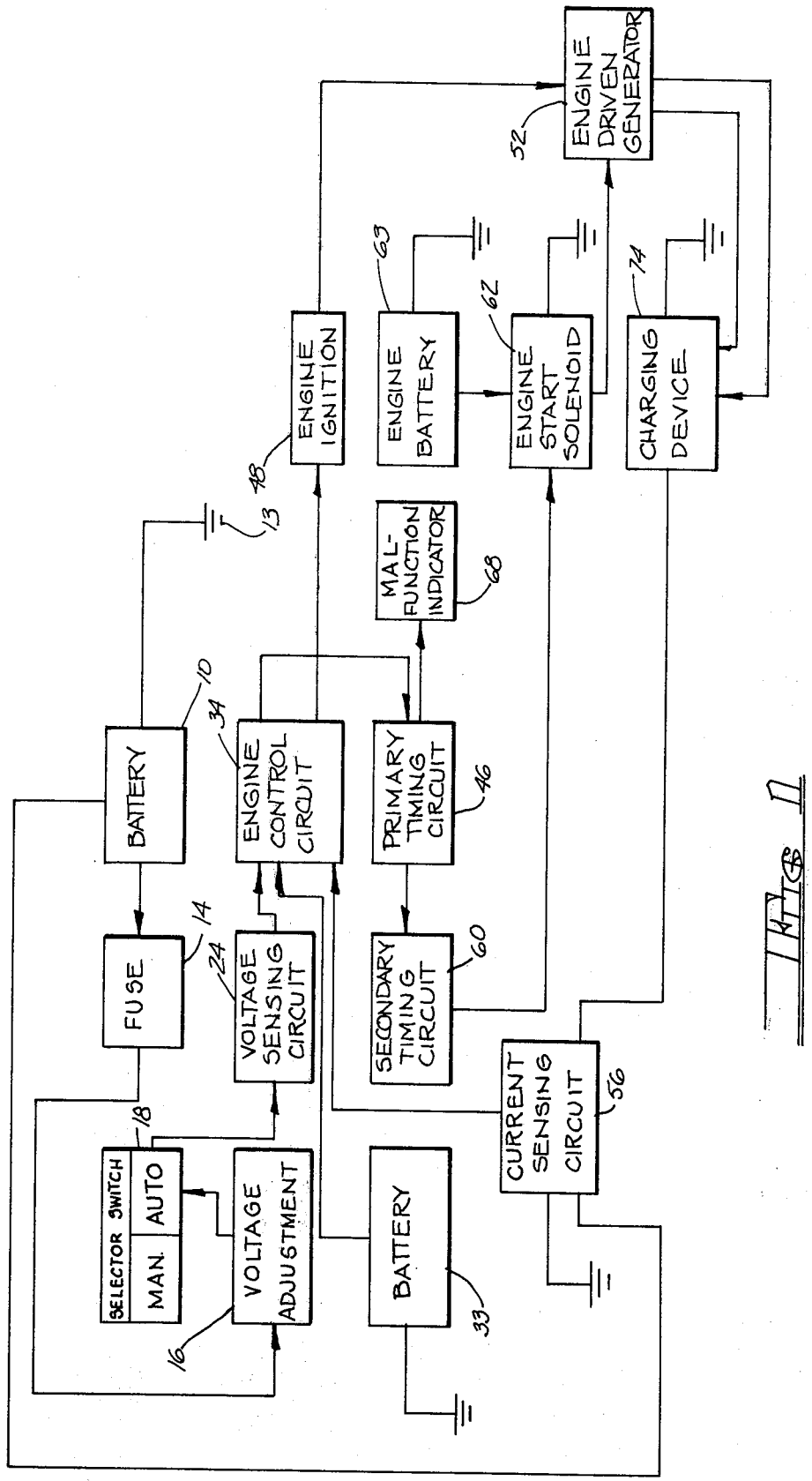
FIG. 1 is a block diagram of one embodiment of the control system of the present invention.

Turning now to a detailed consideration of the present invention, it will be seen from FIGS. 1 and 2, wherein like numerals have been used to identify corresponding functions and/or components, that a D.C. storage battery to be monitored is shown diagrammatically as at 10. Negative terminal 11 of storage battery 10 is connected to ground 13 and positive terminal 12 of storage battery 10 is connected to circuit protection fuse 14. Terminal 15 of circuit protection fuse 14 engages voltage adjustment potentiometer 16 the output terminal 17 of which communicates with terminal 19 of "Auto/Man" selector switch 18. Auto/Man selector switch 18 is a double pole-single throw switch provided in the circuitry to allow for either manual or automatic operation of the invention. In the automatic mode of operation, Auto/Man selector switch 18 is positioned so that contact 19 engages 20 and contact 21 engages contact 22. Contact 20 of Auto/Man selector switch 18 is connected to input terminal 23 of voltage sensing circuit 24. As seen from FIG. 2, voltage sensing circuit 24 comprises two zener diodes 25 and 26 connected in parallel, the output of which engages input terminal 27 of relay 28. Output terminal 29 of relay 28 is connected to ground as at 13. In its energized condition, contact 30 of relay 28 engages contact 31, whereas in the deenergized condition of relay 28 contact 30 engages contact 32 (as shown in FIG. 2).

Operation of voltage sensing circuit 24 is as follows. A preselected portion, controlled by voltage adjustment potentiometer 16, of the voltage of storage battery 10 is applied through Auto/Man selector switch 18 to input terminal 23 of voltage sensing circuit 24. If the voltage applied at input terminal 23 is greater than the break-down voltage of zener diodes 25 and 26, a virtual short will be established between terminal 23 and relay 28 input terminal 27. Consequently, whenever the voltage of storage battery 10, as adjusted by voltage adjustment potentiometer 16, exceeds the break-down voltage of zener diodes 25 and 26, relay 28 is maintained in an energized condition thereby causing contact 30 to engage contact 31. When contact 30 engages contact 31 voltage sensing circuit 24 produces no output signal indicating that storage battery 10 is at a proper voltage level. However, when the voltage of storage battery 10 decreases to a level, as adjusted by voltage adjustment potentiometer 16, below the break-down voltage of zener diodes 25 and 26, there will be a virtual open circuit between contacts 23 and 27 whereby relay 28 will assume a deenergized condition. In the deenergized condition of relay 28, contact 30 engages contact 32 which produces a low voltage output control signal at contact 32 due to the connection of battery 33 to contact 30. Presence of the low voltage output control signal at contact 32 indicates that storage battery 10 is undercharged. In the case of a recreational vehicle, battery 33 may consist of the power source required for starting the vehicle engine and for in-transit operation of vehicle accessories such as headlights and heaters. On the other hand, monitored storage battery 10, is representative of the battery used in recreational vehicles to provide low voltage power for operation of on-board appliances such as lighting, furnaces and water pressure pumps. Battery 33 is normally disconnected or isolated from the circuit powered by monitored battery 10 through the use of either a solenoid switch (not shown) or a simple diode blocking circuit (not shown) which becomes effective when the vehicle engine ignition is in the "off" position.

Engine control circuit 34, which communicates with voltage sensing circuit 24 through interconnection of relay 28 contact 32 and engine control circuit 34 input terminal 35, comprises relay 36 and associated double pole-single throw switch 37. When relay 28 of voltage sensing circuit 24 is deenergized, due to a low voltage condition at storage battery 10, power from battery 33 is transferred from contacts 30 and 32 of relay 28 to input terminal 35 of relay 36. Output terminal 38 of relay 36 is connected to ground as at 13. Power from battery 33 is also supplied to contact 39 of relay 36 associated switch 37.

Thus, upon deenergization of relay 28, power from battery 33 energizes relay 36 whereby switch 37 is closed, contact 39 thereby engaging contact 40 and contact 41 engaging contact 42. In the open position of switch 37 (as shown in FIG. 2) contact 39 engages contact 43 and contact 41 engages contact 44. Energization of relay 36, and the resultant closure of switch 37, serves a dual purpose in the circuitry of the invention. Initially, power is supplied from battery 33, through switch 37 contacts 39 and 40, to both thermal element 45 of time relay 46 and to terminal 47 of normally closed contacts 64 of time relay 46. Simultaneously, when the control system is functioning in its automatic mode of operation, ground path 50, connected across distributor 49 of the ignition system 48 of engine-generator unit 52, is broken by engagement of switch 37 contact 41 with contact 42. Ground path 50 is traceable from ungrounded terminal 51 of switch 53 (switch 53 representing the point of distributor 49), through switch 37 of relay 36 to Auto/Man switch 18, and to ground through contacts 55 and 57 of unenergized relay 58 associated switch 54. Relay 58 and associated switch 54 comprise current sensing circuit 56, operation of which will be described in detail hereinafter. Breaking of ground path 50 by switch 37 enables ignition system 48 so that ignition may occur upon application thereto of appropriate starting signals.

Activation of relay 36 of engine control circuit 34 causes power to be transferred from battery 33 through primary timer 46 and secondary timer 60 and to be applied to starter solenoid 62 of the engine-generator unit 52. Although primary timer 46 and secondary timer 60 are shown in FIG. 2 as comprising time relays, other appropriate and well known timing mechanisms may likewise be employed. Primary timer/time relay 46 is included in the starting circuit of the engine-generator unit 52 in order to prevent discharge of battery 63, battery 63 being used to provide cranking power for the engine-generator unit 52, should a malfunction occur preventing starting. Time relay 46 prevents unnecessary discharge of battery 63 by limiting the length of time a signal may be applied to starter solenoid 62 from battery 33, this period of time denominated, for convenience purposes, the start interval. Similarly, time relay 60 limits the number of times starter solenoid 62 can be energized during the start interval. Although the timing of both time relay 46 and time relay 60 are adjustable, for exemplary purposes only, it will be assumed that time relay 46 is set to provide a start interval of 180 seconds and the cycle time of time relay 60 is set at 15 seconds.

During an undercharged condition of storage battery 10, power from battery 33 is applied through closed switch 37 to thermal element 45 of time relay 46 and to terminal 47 of time relay 46. Power applied to terminal 47 will be transferred through normally closed contacts 64 of time relay 46 and applied to input terminal 66 of time relay 60. Also connected across terminals 47 and 65 of time relay 46 is malfunction indicator 61. Power will be fed through contacts 64 of time relay 46 for the start interval of 180 seconds and, thereupon applied to input terminal 66 of time relay 60. After termination of the start interval, heating element 45 of time relay 46 will cause contacts 64 to open, whereupon power from battery 33 will be routed through malfunction indicator 61 to input terminal 66 of time relay 60. Malfunction indicator 61 serves to provide warning that the engine-generator unit 52 has not started within the start interval. As the current flowing through malfunction indicator 61 is reduced by the impedance thereof, it will not provide sufficient power to energize starter solenoid 62. During the start interval, the total output power of battery 33 is thus applied to input terminal 66 of secondary timer/time relay 60. Current is applied through normally closed contact 67 of time relay 60 to terminal 68 whereupon it energizes both thermal element 69 and starter solenoid 62. If, at the end of a 15 second time period, the engine-generator unit 52 has not started, contacts 67 of time relay 60 are opened due to the thermal action of heating element 69. Consequently, power to thermal element 69 as well as to starter solenoid 62, is terminated. As the bimetallic material of contacts 67 cool, they again close energizing thermal element 69 as well as starter solenoid 62. Thus, for the start interval of 180 seconds (as controlled by time relay 46) time relay 60 will apply power to starter solenoid 62 in 15 second durations.

If no malfunction of the engine-generator unit 52 occurs, power from secondary timer/time relay 60 will energize relay 70 of starter solenoid 62 causing contact 71 of switch 73 to engage contact 72 thereby applying power from battery 63 to engine-generator unit 52 causing ignition of enabled ignition system 48. As discussed previously, ignition system 48 has been enabled by switch 37 breaking ground path 50. Ignition system 48 will drive the engine-generator unit 52 causing the latter to output A.C. power to charging means 74. Charging means 74, whose purpose is to rectify the A.C. output of the engine-generator unit 52 for application to storage battery 10, comprises transformer 75 and a diode bridge circuit consisting of diodes 76, 77, 78 and 79. Charging current from charging means 74 is applied to relay 58 of current sensing means 56 whereupon it is impressed upon positive terminal 12 of storage battery 10. Since the voltage output of charging means 74 is higher than the voltage of storage battery 10 at full charge, voltage sensing circuit 24 senses the increased voltage and deenergizes engine control circuit 34. Relay 36 associated switch 37 thereby removes power from primary timer means 46 by causing contact 39 to engage contact 43 and, simultaneously, partially reestablishes ground path 50 by causing contact 41 to engage contact 44. Termination of power to starter solenoid 62 is thereby achieved once the engine-generator unit 52 has been started.

As mentioned above, deenergization of relay 36, after engine driven A.C. generator 52 has started, only partially reestablishes ground circuit 50. Ground path 50 remains open as a result of energized relay 58 of current sensing means 56 causing normally closed switch 54 to open thereby breaking from ground at contact 57. As the specific gravity of storage battery 10 at the start of the recharging cycle is low, the internal resistance of storage battery 10 is likewise reduced and, current through relay 58 of current sensing means 56 is high. This high level of charging current is sufficient to maintain relay 58 in an energized condition (thereby maintaining the break in ground path 50 at contact 57) but, when the current is decreased due to increased internal resistance of storage battery 10 to a point reflecting full charge of storage battery 10, current through current sensing means 56 will be insufficient to maintain relay 58 energized. As a result, when storage battery 10 has become fully charged, relay 58 will become deenergized whereupon switch 54 will cause contact 55 to engage contact 57 completing ground path 50. Completion of ground path 50 will shortcircuit distributor 49 thereby terminating operation of ignition system 48 and resultantly stopping the input of charging current to storage battery 10.

At this point, storage battery 10 has regained its charge and the control system is reestablished in its original monitoring condition. Should the voltage at terminal 12, as adjusted by voltage adjustment potentiometer 16 again drop below the breakdown voltage of zener diodes 25 and 26, a similar recharging process will again be initiated.

Auto/Man selector switch 18 provides convenient means by which operation of the recharging process may be manually controlled. By depressing Auto/Man selector switch 18 (to the position shown in FIG. 2) a break in ground path 50 is established, between contacts 21 and 22, and, simultaneously, voltage from storage battery 10 is removed from input terminal 23 of voltage sensing circuit 24. Voltage sensing circuit 24 senses the absence of voltage at terminal 23 and, as ignition system 48 is enabled by the break in ground path 50 between contacts 21 and 22 of Auto/Man selector switch 18, charging current from the engine-generator unit 52 will be applied to positive terminal 12 of storage battery 10 through charging means 74 and current sensing means 56. Input of charging current to storage battery 10 will continue until Auto/Man selector switch 18 is repositioned to its automatic position, wherein contact 19 engages contact 20 and contact 21 engages 22. Voltage from storage battery 10 will thereupon again be applied to input terminal 23 of voltage sensing circuit 24 and ground path 50 will be closed allowing ignition system 48 to become disenabled. Thus, by means of Auto/Man selector switch 18, charging of storage battery 10 is manually controllable, regardless of the charge on storage battery 10.

Another embodiment of the present invention which, is substantially similar in operation to the device depicted in the schematic of FIG. 2, is shown in FIG. 3. It will be noted that the circuitry of the FIG. 3 embodiment is basically the same as that shown in FIG. 2 with certain exceptions to be described hereinafter.

It will be recalled that, in the circuit of FIG. 2, both energization and de-energization of relay 58 of the current sensing circuit 56 is dependent upon the level of current through the relay windings. This creates an undesirable sensitive adjustment condition which, if not properly made, could lead to a malfunction of the system. To alleviate this problem, the current sensing circuit 56 of FIG. 3 incorporates a relay 58 having two individual coil windings 88 and 89. Coil 88 is a D.C. voltage coil and performs a function analagous to the lower pole of switch 37 (i.e., the pole connecting contact 41 to contact 42 or 44) of the FIG. 2 embodiment. That is, upon the occurance of a low voltage condition at terminal 12 of storage battery 10, voltage coil 88 will energize relay 58 causing contact 57 to engage contact 98 thereby breaking ground path 50 and enabling the distributor 49 of the ignition system 48. Thereafter, and upon ignition of the charging sequence, the voltage output of charging means 74 is higher than the voltage of storage battery 10 at full charge. The voltage sensing circuit 24 senses the increased voltage at terminal 12 and deactivates voltage coil 88. This would result in grounding the distributor 49 of the ignition system 48 except that, substantially simultaneously with the de-energization of voltage coil 88, the current coil 89, which is wound upon voltage coil 88, is energized by means of the high charging current through its windings from charging means 74. In this manner, contact 57 maintains engagement with contact 98 maintaining ground path 50 open until storage battery 10 has been fully recharged and the charging current has dropped below the holding level of relay 58. It will therefore be appreciated that, in the embodiment of FIG. 3, energization of the current sensing means 56 is a function of voltage whereas de-energization thereof is a function of current.

It will also be noted that the circuit shown in FIG. 3 eliminates the need for battery 33 which, in the FIG. 2 embodiment, is utilized to generate the low voltage control signal from the voltage sensing circuit 24. This is accomplished by repositioning the engine control circuit 34 with respect to primary and secondary timers 46 and 60. In FIG. 3, the engine control circuit 34 follows the timers 46 and 60 (instead of preceeding them as in FIG. 2) and has its relay contacts 90 and 92 connected and parallel with contacts 96 and 97 of the manual start monetary switch 95. Accordingly, when relay 36 of the engine control circuit 34 is energized (during a low voltage condition) and contact 90 engages contact 92, starting voltage from the positive terminal 93 of battery 63 is applied to the input terminal 96 of the starter solenoid 62 causing ignition of the enabled ignition system 48.

Furthermore, it will be noted that, in the embodiment of FIG. 3, relay 28 of the voltage sensing circuit 24 has been modified to comprise a double pole switch rather than the single pole switch shown in FIG. 2. As so modified, contacts 83 and 82 of relay 28 serve two purposes. Initially, contacts 83 and 82 apply voltage from the negative terminal 11 of storage battery 10 to relay 36 of the engine control circuit 34 through the normally closed contacts 64 and 67 of the primary and secondary timers 46 and 60. In addition, contacts 83 and 82 apply, through contact 65 of primary timer 46, the initial negative control to the voltage coil 88 as well as a negative signal to the heater 69 of the secondary timer 60. With respect to the lower pole of relay 28, it will be recognized that contacts 84 and 85 apply voltage from the positive terminal 12 of storage battery 10 to the heaters 45 and 69 of the primary and secondary timers 46 and 60. Also, after the charging sequence has begun and relay 28 is de-energized, contacts 84 and 86 will apply voltage from the positive terminal 12 of storage battery 10 to the charging indicator 87 providing an indication that charging is in process.

Operation of the circuit shown in FIG. 3 can briefly be described as follows. The voltage at terminal 12 of storage battery 10 is applied through circuit protection fuse 14 and voltage adjustment potentiometer 16 to the input terminal 23 of voltage sensing circuit 24. If the voltage at input terminal 23 exceeds the break-down voltage of zener diodes 25 and 26 the latter will be conductive and energize relay 28 causing contact 83 to engage contact 81. In this condition of relay 28, no further control signals will be applied to the remaining circuitry. However, if the voltage applied to terminal 23 is less than the break-down voltage of zener diodes 25 and 26 the latter will be nonconductive de-energizing relay 28 and causing contact 83 to engage contact 82. In this orientation, relay 28 will transmit a low voltage control signal from the negative terminal 11 of storage battery 10 to output terminal 82.

The low voltage control signal from contact 82 is applied through the primary and secondary timers 46 and 60 (in the manner hereinbefore described) to the relay 36 of the engine control circuit 34. At the same time, the low voltage control signal is applied from contact 82 to contact 65 of the primary timer 46 and thereupon to the input terminal 99 of the voltage coil 88. Thus, substantially simultaneously, the low voltage control signal will (1) energize voltage coil 88 which activates relay 58 causing contact 57 to engage contact 98 thereby enabling the ignition system 48 by breaking ground path 50 and (2) energize relay 36 of the engine control circuit 34 causing contact 90 to engage contact 91 thereby activating starter solenoid 62 by applying power from battery 63 to starter solenoid input terminal 96.

The engine-generator unit 52 will subsequently produce an A.C. charging signal which is applied through rectifier 74, current coil 89 of relay 58 and therefrom to the positive terminal 12 of storage battery 10. The voltage sensing circuit 24 will sense the high voltage associated with the charging signal at terminal 12 and thereby energize relay 28 causing contact 83 to engage contact 81. As a result, both the engine control circuit 34 and the voltage coil 88 become deenergized. However, due to the high level of charging current flowing through the current coil 89, relay 58 remains energized and maintains ground path 50 open between contacts 55 and 57. As the charging current reduces to a point reflecting full charge of storage battery 10, current through the current coil 89 will be insufficient to maintain relay 58 energized. As a result, when the storage battery 10 has become fully charged, relay 58 will become de-energized whereupon contact 55 will engage contact 57 completing ground path 50. Completion of ground path 50 will short circuit distributor 49 thereby terminating operation of the ignition system 48 and cutting off the input of charging current to storage battery 10.

Although the control system of the present invention has been described in terms of two preferred embodiments, modifications may be made to the invention without departing from the spirit of it. For example, primary and secondary timers, 46 and 60 respectively, could comprise binary counters rather than time relays as described herein. Furthermore, the various switching functions could be accomplished by transistor switches as distinguished from relays and, the voltage and current sensing functions could be accomplished by digital means. Also, various voltmeters, ammeters and indicating lights could easily be included to serve as indicators of the various functions of the control system as they are performed.

The embodiments of the invention in which an exclusive property or privilege is claimed are defined as follows:

1. An automatic monitoring and recharging system adapted to continuously monitor the terminal voltage of an originally fully charged D.C. storage battery and, upon said terminal voltage falling below a first preselected value, recharging said storage battery to said originally fully charged condition, thereafter resuming said continuous monitoring of said terminal voltage, said system comprising:
   a. charging means for applying a charging signal to said storage battery upon enablement and activation thereof;
   b. voltage sensing means for sensing said terminal voltage and including means responsive thereto for applying an activating signal to said charging means whenever said terminal voltage falls below said first preselected value;
   c. current sensing means intermediate said charging means and said storage battery for sensing the amperage of said charging signal; and
   d. switching means having first means responsive to said voltage sensing means and second means responsive to said current sensing means, said first means enabling said charging means only so long as said terminal voltage is below said first preselected value and said second means maintaining said charging means enabled only so long as said amperage of said charging signal is above a second preselected value.

2. The automatic monitoring and recharging system according to claim 1 wherein said charging means comprises:
   a. an engine-generator unit for producing an A.C. output charging signal, said engine-generator unit having a starter solenoid and an ignition system, said starter solenoid being activatable by said voltage sensing means in response to said activating signal and said ignition system being enablable by said first and second means of said switching means; and
   b. rectifier means connected to said engine-generator unit for rectifying said A.C. output charging signal, said rectified charging signal comprising said charging signal.

3. The automatic monitoring and recharging system according to claim 2, wherein said voltage sensing means comprises;
   a. a voltage sensing circuit communicating with said storage battery, said voltage sensing circuit outputting a low voltage control signal whenever said terminal voltage is less than said first preselected value; and
   b. an engine control circuit connected to the output of said voltage sensing circuit and responding to said low voltage control signal by developing and applying said activating signal to said starter solenoid.

4. The automatic monitoring and recharging system according to claim 3 wherein said first means of said switching means includes means for enabling said ignition system substantially simultaneously with said application of said activating signal to said starter solenoid.

5. The automatic monitoring and recharging system according to claim 3 including primary timer means associated with said engine control circuit, said primary timer means permitting substantially unimpeaded transmission of said activating signal to said starter solenoid and, after a first preselected timing interval preventing transmission of said activating signal.

6. The automatic monitoring and recharging system according to claim 5 including secondary timer means associated with said primary timer means, said secondary timer means repetitively interrupting, at a preselected rate and for second preselected timing intervals, said activating signal.

7. The automatic monitoring and recharging system according to claim 5 wherein said primary timer means comprises a first time delay thermal relay, the associated time delay of which defines said first preselected timing interval.

8. The automatic monitoring and recharging system according to claim 6 wherein said secondary timer means comprises a second time delay thermal relay of the type having a thermal element, the associated time delay of said second thermal relay defining said second preselected timing interval and, the cooling rate of said thermal element reflecting said preselected interrupting rate.

9. The automatic monitoring and recharging system according to claim 6 wherein said preselected interrupting rate of said secondary timer means provides for at least one interruption during said first preselected timing interval.

10. The automatic monitoring and recharging system according to claim 3 wherein said voltage sensing circuit comprises:
    a. a D.C. power source;
    b. a parallel combination of at least two zener diodes having an input and an output, said input communicating with said D.C. storage battery; and
    c. a first relay having an input and an output, said input being connected to said output of said at least two zener diodes and having a pole connected to said power source whereby, whenever said terminal voltage drops below said first preselected value said zener diodes are non-conductive and de-energize said first relay causing said power source to be connected to said first relay output.

11. The automatic monitoring and recharging system according to claim 10 wherein said D.C. power source is said D.C. storage battery.

12. The automatic monitoring and recharging system according to claim 3 wherein a voltage adjustment potentiometer is intermediate said storage battery and said voltage sensing circuit, said voltage adjustment potentiometer controlling the voltage level applied to said voltage sensing circuit from said storage battery.

13. The automatic monitoring and recharging system according to claim 10 wherein said ignition system includes a distributor having a conductor leading therefrom, said conductor passing through said engine control circuit, said current sensing means and terminating in ground whereby, said engine control circuit, in response to said low voltage control signal from said voltage sensing circuit, opens said conductor passing therethrough and, said current sensing means, whenever said amperage of said charging signal is above said second preselected value, opens said conductor passing therethrough.

14. The automatic monitoring and recharging system according to claim 3 wherein said ignition system includes a distributor having a conductor leading therefrom and passing through said current sensing means to ground whereby, said current sensing means, in response to said low voltage control signal from said voltage sensing circuit, opens said conductor and, whenever said amperage of said charging signal is above said second preselected value, maintains said conductor open.

15. The automatic monitoring and recharging system according to claim 13 wherein said engine control circuit comprises a second relay connected to said output of said first relay and having first and second co-acting poles, said first pole associated with said power source, said second pole being in the circuit of said conductor whereby, upon energization of said second relay by said low voltage control signal from said voltage sensing circuit said first pole connects said power source to the output of said second relay thereby generating said activating signal and said second pole opens said conductor enabling said ignition system.

16. The automatic monitoring and recharging system according to claim 14 wherein said engine control circuit comprises:
 a. a second D.C. power source; and
 b. a third relay connected to said output of said first relay and having a pole associated with said second power source whereby, upon energization of said third relay by said low voltage control signal from said voltage sensing circuit said third relay pole connects said second power source to the output of said third relay thereby generating said activating signal.

17. The automatic monitoring and recharging system according to claim 15 wherein said current sensing means comprises a fourth relay having a pole in the circuit of said conductor, said fourth relay causing said fourth relay pole to open said conductor only so long as said amperage of said charging signal is above said second preselected value.

18. The automatic monitoring and recharging system according to claim 16 wherein said current sensing means comprises a fifth relay having a pole in the circuit of said conductor, said fifth relay including:
 a. a voltage coil wound on the core of said fifth relay, said voltage coil being connected to said output of said voltage sensing circuit whereby, upon energization of said voltage coil by said low voltage control signal said fifth relay pole opens said conductor passing through said current sensing means; and
 b. a current coil wound on the core of said fifth relay, said current coil being connected to said rectifier means and maintaining said fifth relay pole open only so long as said amperage of said charging signal is above said second preselected value.

19. The automatic monitoring and recharging system according to claim 1 including, in association with said storage battery and said voltage sensing means, a switch having two co-acting poles, actuation of said switch simultaneously enabeling said charging means and causing said voltage sensing means to activate said charging means whereby, said charging signal is applied to said storage battery at least until said switch is deactuated.

20. The automatic monitoring and recharging system according to claim 6 wherein said primary and secondary timers are connected in series between said engine control circuit and said starter solenoid.

21. The automatic monitoring and recharging system according to claim 6 wherein said primary and secondary timers are connected in series between said voltage sensing circuit and said engine control circuit.

* * * * *